United States Patent
Chirakansakcharoen et al.

(10) Patent No.: US 10,593,163 B2
(45) Date of Patent: *Mar. 17, 2020

(54) METHOD, COMPUTER PROGRAM PRODUCT, AND SYSTEM FOR PRODUCING COMBINED IMAGE INFORMATION TO PROVIDE EXTENDED VISION

(71) Applicant: Toshiba Global Commerce Solutions Holdings Corporation, Tokyo (JP)

(72) Inventors: Monsak Jason Chirakansakcharoen, Raleigh, NC (US); Dean Frederick Herring, Youngsville, NC (US); Ankit Singh, Apex, NC (US); David John Steiner, Raleigh, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 37 days.

This patent is subject to a terminal disclaimer.

(21) Appl. No.: 15/837,507

(22) Filed: Dec. 11, 2017

(65) Prior Publication Data

US 2018/0108074 A1    Apr. 19, 2018

Related U.S. Application Data

(63) Continuation of application No. 14/675,161, filed on Mar. 31, 2015, now Pat. No. 9,842,363.

(Continued)

(51) Int. Cl.
*G06K 9/00* (2006.01)
*G07G 1/00* (2006.01)
(Continued)

(52) U.S. Cl.
CPC ........... *G07G 1/0054* (2013.01); *G01B 11/00* (2013.01); *G01G 19/4144* (2013.01);
(Continued)

(58) Field of Classification Search
None
See application file for complete search history.

(56) References Cited

U.S. PATENT DOCUMENTS 8,040,361 B2    10/2011    Bachelder et al.
8,493,408 B2    7/2013    Williamson et al.
(Continued)

FOREIGN PATENT DOCUMENTS

WO    2014/033354 A1    3/2014

OTHER PUBLICATIONS

Zhu et al.: "Stereo Mosaics From a Moving Video Camera for Environmental Monitoring", First International Workshop on Digital and Computational Video, Tampa, FL, Dec. 10, 1999.

(Continued)

*Primary Examiner* — Xiao M Wu
*Assistant Examiner* — Steven Z Elbinger
(74) *Attorney, Agent, or Firm* — Patterson + Sheridan, LLP

(57) ABSTRACT

Method, computer program product, and system to provide an extended vision within an environment having a plurality of items, where the extended vision is based on a field of view of a person determined using a first visual sensor, and is further based on at least a second visual sensor disposed within the environment. Image information from the first and second visual sensors is associated to produce combined image information. Selected portions of the combined image information are displayed based on input provided through a user interface.

20 Claims, 10 Drawing Sheets

Related U.S. Application Data

(60) Provisional application No. 62/064,323, filed on Oct. 15, 2014.

(51) Int. Cl.

| | | |
|---|---|---|
| *G01G 19/414* | (2006.01) | |
| *G06Q 20/18* | (2012.01) | |
| *G06Q 20/20* | (2012.01) | |
| *G06Q 10/08* | (2012.01) | |
| *G06T 7/66* | (2017.01) | |
| *G06K 9/20* | (2006.01) | |
| *G06Q 30/06* | (2012.01) | |
| *G01S 19/13* | (2010.01) | |
| *G06Q 20/32* | (2012.01) | |
| *G06Q 30/00* | (2012.01) | |
| *H04N 5/225* | (2006.01) | |
| *H04N 7/18* | (2006.01) | |
| *G06Q 30/02* | (2012.01) | |
| *G06K 9/62* | (2006.01) | |
| *G06K 9/78* | (2006.01) | |
| *G06F 1/16* | (2006.01) | |
| *G06F 3/01* | (2006.01) | |
| *G06K 9/46* | (2006.01) | |
| *G06T 11/60* | (2006.01) | |
| *H04N 5/232* | (2006.01) | |
| *G01B 11/00* | (2006.01) | |
| *G01G 19/40* | (2006.01) | |
| *G01B 11/02* | (2006.01) | |

(52) U.S. Cl.
CPC ............. *G01S 19/13* (2013.01); *G06F 1/163* (2013.01); *G06F 3/012* (2013.01); *G06F 3/013* (2013.01); *G06K 9/00221* (2013.01); *G06K 9/00255* (2013.01); *G06K 9/00288* (2013.01); *G06K 9/00362* (2013.01); *G06K 9/00536* (2013.01); *G06K 9/00577* (2013.01); *G06K 9/00624* (2013.01); *G06K 9/209* (2013.01); *G06K 9/46* (2013.01); *G06K 9/6201* (2013.01); *G06K 9/6267* (2013.01); *G06K 9/78* (2013.01); *G06Q 10/087* (2013.01); *G06Q 20/18* (2013.01); *G06Q 20/204* (2013.01); *G06Q 20/208* (2013.01); *G06Q 20/209* (2013.01); *G06Q 20/322* (2013.01); *G06Q 30/016* (2013.01); *G06Q 30/0224* (2013.01); *G06Q 30/0235* (2013.01); *G06Q 30/0251* (2013.01); *G06Q 30/0269* (2013.01); *G06Q 30/0609* (2013.01); *G06Q 30/0623* (2013.01); *G06Q 30/0629* (2013.01); *G06Q 30/0631* (2013.01); *G06Q 30/0633* (2013.01); *G06Q 30/0635* (2013.01); *G06Q 30/0639* (2013.01); *G06T 7/66* (2017.01); *G06T 11/60* (2013.01); *G07G 1/0045* (2013.01); *G07G 1/0063* (2013.01); *G07G 1/0072* (2013.01); *H04N 5/225* (2013.01); *H04N 5/232* (2013.01); *H04N 7/181* (2013.01); *G01B 11/02* (2013.01); *G01G 19/40* (2013.01); *G06K 2009/00328* (2013.01); *G06K 2209/17* (2013.01); *G06T 2207/30232* (2013.01)

(56) References Cited

U.S. PATENT DOCUMENTS

| | | |
|---|---|---|
| 8,494,215 B2 | 7/2013 | Kimchi et al. |
| 8,698,874 B2 | 4/2014 | Watson et al. |
| 9,244,280 B1 | 1/2016 | Tiana et al. |
| 2004/0223190 A1* | 11/2004 | Oka ................... G06T 15/205 358/302 |
| 2008/0291279 A1 | 11/2008 | Samarasekera et al. |
| 2009/0237564 A1 | 9/2009 | Kikinis et al. |
| 2011/0279446 A1 | 11/2011 | Castro et al. |
| 2012/0314015 A1* | 12/2012 | Watson ................... H04N 7/15 348/14.1 |
| 2012/0327269 A1* | 12/2012 | Hwang ............. H04N 5/23219 348/234 |
| 2013/0222371 A1 | 8/2013 | Reitan |
| 2014/0098185 A1 | 4/2014 | Davari et al. |
| 2014/0247352 A1 | 9/2014 | Rathi et al. |
| 2014/0257943 A1* | 9/2014 | Nerayoff ................ G06T 7/292 705/13 |
| 2014/0368620 A1* | 12/2014 | Li ...................... H04N 5/23293 348/50 |
| 2015/0012396 A1 | 1/2015 | Puerini et al. |
| 2015/0015694 A1* | 1/2015 | Au ............................ F27D 21/02 348/83 |
| 2015/0019391 A1 | 1/2015 | Kumar et al. |
| 2015/0023775 A1* | 1/2015 | Bonefas ................ A01D 43/087 414/813 |
| 2015/0042815 A1* | 2/2015 | Park ........................ H04N 7/181 348/159 |
| 2016/0110902 A1 | 4/2016 | Chirakansakcharoen et al. |

OTHER PUBLICATIONS

Pennington: "CES 2014 Preview: Google Glass Could Deliver 360-Degree Coverage of Live Sports Action", http://www.hollywoodreporter.com/behind-screen/ces-2014-preview-google-glass-660554, Jan. 2, 2014.

Shamah: "SceneNet Turns Mobile Video Clips Into {Almost} Live 3-D Events: Stitched together crowdsourced footage from shows and games creates a viewing experience nearly as good as being there", The Times of Israel, www.timesofisrael.com, Sep. 23, 2014.

* cited by examiner

METHOD, COMPUTER PROGRAM PRODUCT, AND SYSTEM FOR PRODUCING COMBINED IMAGE INFORMATION TO PROVIDE EXTENDED VISION

CROSS-REFERENCE TO RELATED APPLICATIONS

This application is a continuation of co-pending U.S. patent application Ser. No. 14/675,161, filed on Mar. 31, 2015, which claims benefit of expired U.S. provisional patent application Ser. No. 62/064,323, filed Oct. 15, 2014. Each of the aforementioned patent applications is herein incorporated by reference in its entirety.

BACKGROUND

The present disclosure relates to a sensor-based environment, and more specifically, techniques for providing an extended vision based on a field of view of a person within the environment and one or more visual sensors disposed throughout the environment.

Figure 1:
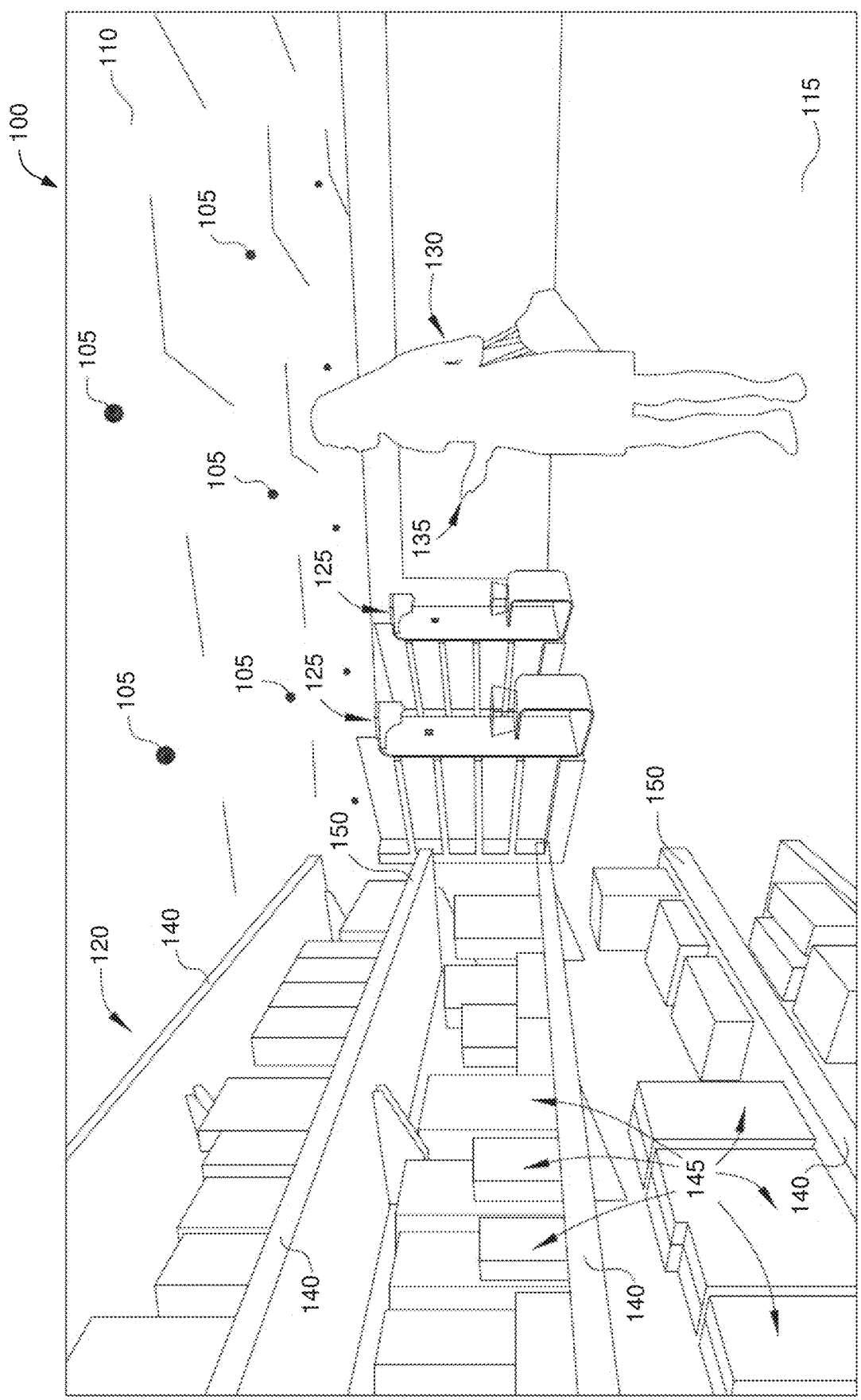
FIG. 1 illustrates an exemplary environment including a plurality of items, according to one embodiment.

To facilitate understanding, identical reference numerals have been used, where possible, to designate identical elements that are common to the figures. It is contemplated that elements disclosed in one embodiment may be beneficially utilized on other embodiments without specific recitation. The illustrations referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Aspects of the current disclosure relate to an integrated environment capable of providing a personalized, automated, and adaptive experience for a person within the environment. A number of different sensor devices may be employed within the environment, and networked with various computing devices such as point-of-sale (POS) terminals, digital signage, servers, and mobile or handheld computing devices to provide a seamless integration of mobile technologies and e-commerce into traditional experiences.

Embodiments disclosed herein are generally directed to providing an extended vision within an environment having a plurality of items that are available for selection. The extended vision is based on a determined field of view of a person, such as a customer or employee, having a first computing device coupled with a first visual sensor. The environment is also associated with at least a second computing device coupled with one or more second visual sensors, which may be disposed throughout the environment. The image information from the first and second visual sensors is associated to produce combined image information, which may be displayed on a display device and that may be traversed using a user interface (UI). In some embodiments, the person having the first computing device may view the displayed combined image information, scrolling or otherwise navigating beyond their natural field of view to observe items located elsewhere in the environment. In some embodiments, the combined image information may be available for viewing or reviewing by employees in the course of performing security functions. While many concepts and terms are generally discussed within the context of a shopping environment, such as a retail store, it is contemplated that the techniques disclosed herein may be applied to other environments (some non-limiting examples include libraries, museums, classrooms, hospitals, etc.) to provide an adaptive experience for persons included therein.

FIG. 1 illustrates an exemplary environment including a plurality of items, according to one embodiment. The environment 100 includes a plurality of sensor modules 105 disposed in the ceiling 110 of the environment. The sensor modules 105 may each include one or more types of sensors, such as video sensors (e.g., cameras), audio sensors (e.g., microphones), and so forth. Sensor modules 105 may also include actuating devices for providing a desired position and/or orientation of the included sensor(s). Generally, the sensor modules or individual sensors may be disposed at any suitable location within the environment 100. Some non-limiting examples of alternative locations include below, within, or above a floor 115 of the environment, within other structural components of the environment 100 such as a shelving unit 120 or walls, and so forth. In some embodiments, sensors may be disposed on, within, or near item display areas such as the shelving unit 120. The sensors may be oriented toward expected locations of personal interactions with items in order to acquire better data about the person's interactions, such as determining the person's field of view relative to certain items, updating a virtual cart or transaction record for the person's transaction in the environment, and so forth.

Environment 100 also includes a number of computer-based terminals (or kiosks) 125. Generally, terminals 125 may be configured for performing customer checkout and/or other functions, such as providing information to a customer or employee. Each terminal 125 may each include a discrete computing device or portions of a computing system, and may include various I/O devices, such as visual displays, audio speakers, cameras, microphones, etc. for interacting with various persons such as customers and/or employees.

In some embodiments, a person 130 in the environment may have a mobile computing device, such as a smartphone 135, that communicatively couples with the terminal 125 for completing a checkout transaction. For example, the person's smartphone 135 may include payment information, identification information, etc. that facilitate completion of the checkout transaction. In one embodiment, the mobile computing device may execute a store application that connects with the computing system of the environment (e.g., to store servers or other computing devices through the Internet). In one embodiment, the mobile computing device may be directly connected with kiosk 125 through wireless networks established within the environment (e.g., over Wi-Fi or Bluetooth). In one embodiment, the mobile computing device may couple with the kiosk 125 when brought within range, e.g., using Bluetooth or near-field communication (NFC).

Environment 100 also includes one or more shelving units 120 having shelves 140 that support various store items 145. Though not shown, multiple shelving units 120 may be disposed in a particular arrangement in the environment 100, with the space between adjacent shelving units forming aisles through which customers and employees may travel. For example, customers may navigate the aisles and/or approach the shelving units 120 to view items 145 included therein, to handle the items, to select the items, etc. In another example, employees may navigate the aisles and/or approach the shelving units 120 to view stock levels of the items 145, to determine out-of-place items, etc. In some embodiments, shelving units 120 may include visual sensors or other sensor devices or I/O devices. The sensors or devices may couple with the person's smartphone 135 and/or other networked computing devices (including terminals 125 and/or servers) that are associated with the environment 100. For example, the front portions 150 of shelves 140 may include video sensors oriented outward from the shelving unit 120 (i.e., toward the aisle) to acquire image information for a person's interactions with items 145 on the shelving unit 120, with the image information provided to back-end servers for storage and/or analysis. In some cases, some or all of the image information may also be accessible by a person's mobile computing device. In some embodiments, portions of the shelving unit 120 (such as the front portions 150 of shelves 140) may include indicator lights or other visual display devices or audio output devices that are able to communicate with a person.

During an exemplary transaction in the environment, the person 130 may have a shopping receptacle in which the person places items after they are selected for purchase. Examples of shopping receptacles include shopping carts, baskets, or other containers that may be carried or otherwise transported by the person during the transaction. Upon completion of the transaction—for example, the person has selected all of the desired items—the person may approach one of the terminals 125 or a designated checkout area to perform a checkout transaction.

During a transaction, a person at a particular location may desire to view different areas within the environment, but is unable to do so for one or more reasons. In some cases, certain items in the environment may be disposed on relatively high or low shelving, but the person who seeks to view the items is not naturally able to do so—for example, the person may be too short to view items on high shelving or not capable of stooping or bending to view items on low shelving. In some cases, a person may seek to view items that are located outside their natural field of view at their location—for example, the items may be located further down a same aisle on the same or different shelving, or perhaps within a different aisle or area altogether.

Providing an extended vision for the person using image information acquired from visual sensors may be advantageous across a number of functions ordinarily performed within the environment. In the example discussed above, a customer while shopping may use the extended vision to view out-of-sight items or items located remotely from the customer's location. In another example, an employee may use the extended vision to perform inventory checking for out-of-sight items or remotely located items. In another example, an employee or administrator of the environment may use the extended vision as part of a security function, monitoring different areas of the environment. In another example, the additional image information as part of the extended vision—even if spatially overlapping with other image information—may be used to further enhance gesture and item identification.

Figure 2:
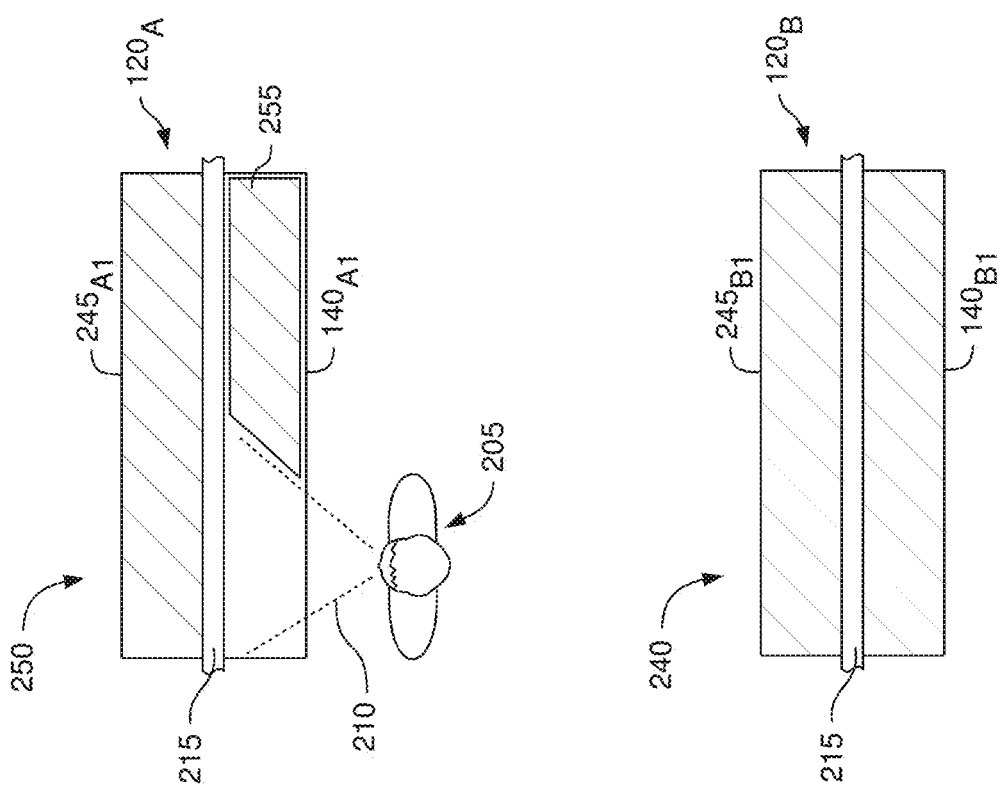
FIG. 2 illustrates example limitations of vision for a person in an environment, according to one embodiment.
Figure 2:
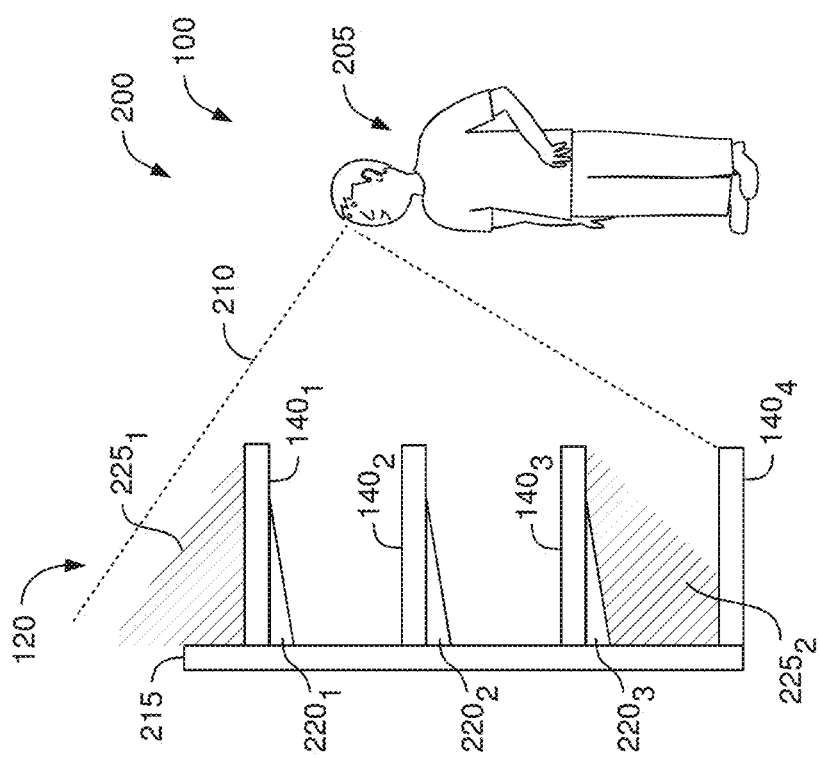

FIG. 2 illustrates example visual limitations for a person in an environment, according to one embodiment. Scene 200 illustrates a side view depiction of a person 205 viewing the front of a shelving unit 120. Items that may normally be displayed on shelving unit 120 are not depicted here for clarity. The shelving unit 120 includes several structural members, such as a back member 215 and one or more shelves $140_{1-4}$ coupled therewith. The back member 215 may have a planar shape and extend along a length of the shelves 140 (as shown, the direction of the length may extend into and out of the page). In some cases, the back member may be wall-mounted or base-supported as part of a standalone shelving unit (e.g., a gondola unit). The shelves 140 may be coupled directly with the back member 215, e.g., using hooks, tabs, or other complementary fittings, and/or fasteners. The shelves may alternatively be coupled with one or more braces or brackets 220, which in turn are coupled with the back member 215.

The person 205 is associated with a field of view 210. Fields of view may differ based on the characteristics of the person, such as their height, as well as based on their relative position and orientation. For example, a person standing on his or her tiptoes may have a different field of view than the same person standing flatfooted, kneeling, sitting, etc. Additionally, a person standing nearer to the shelving unit 120 may have a narrower field of view than if the person were standing further away. As shown, the person 205 is able to observe items on the shelves $140_2$, $140_3$, and items positioned towards the front of shelf $140_4$. However, the person 205 is unable to observe items included in one or more areas $225_1$, $225_2$ due to a visual occlusion that is caused by the shelves $140_1$, $140_3$.

Scene 240 provides a top view that generally corresponds to the side view illustrated in scene 200. Here, the person 205 is viewing a first shelving unit 120A; a second shelving unit 120B is spatially separated from the first shelving unit 120A by an aisle 250. The shelving unit 120A includes a back member 215A and shelves $140A_1$ and $245A_1$ on opposing sides of the back member 215A. As shown, the person 205 has a field of view 210 that includes a portion of shelf $140A_1$. However, based on their current location, the person 205 may be unable to see items included in an area 255 on the shelf $140A_1$. Additionally, the back member 215A may obscure the person's vision such that the person 205 cannot effectively view items on other shelf $245A_1$ or on shelving unit 120B through the back member 215A.

Figure 3:
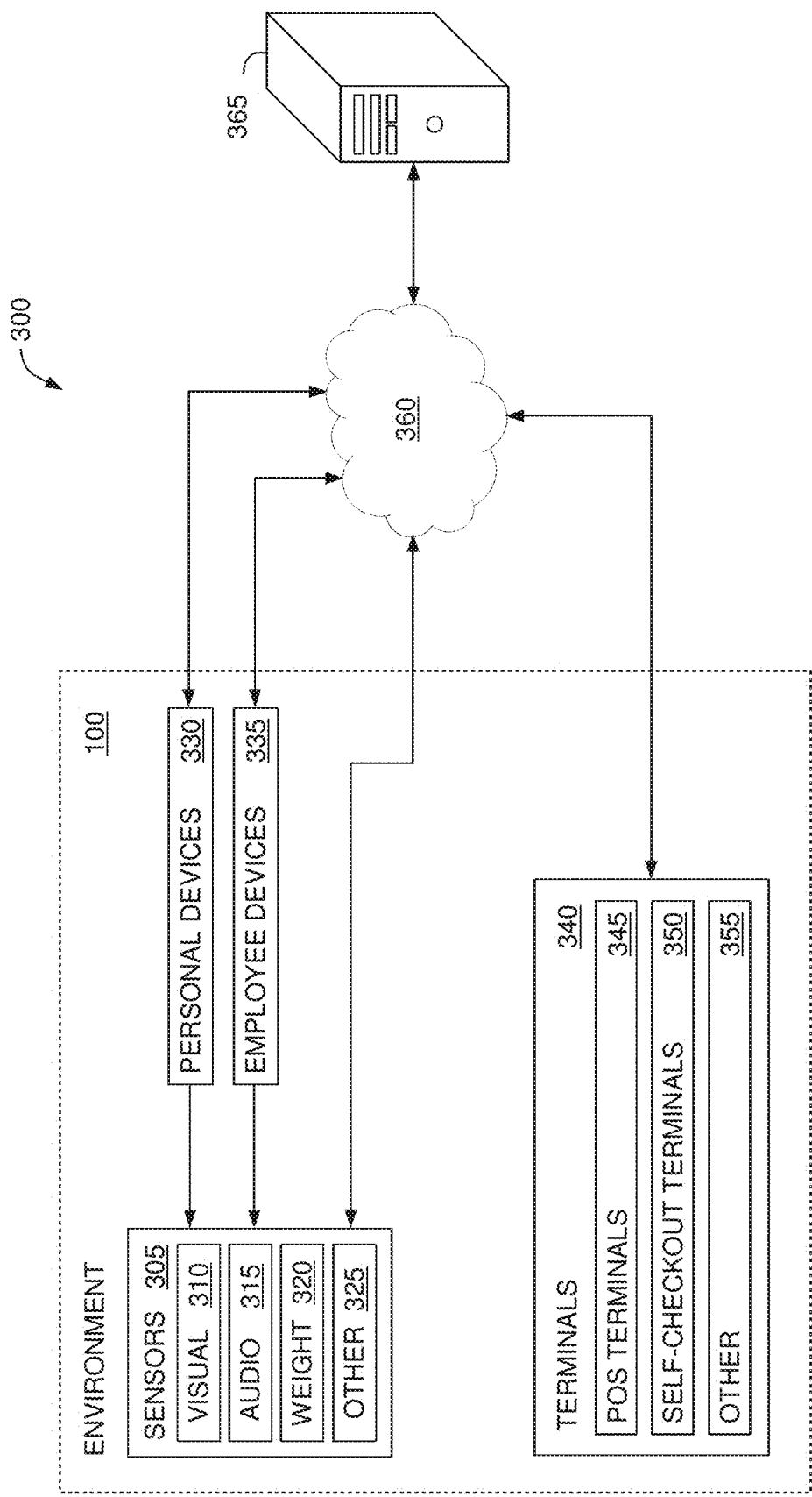
FIG. 3 illustrates an exemplary system for providing an extended vision within an environment based on a determined field of view for a person, according to one embodiment.

FIG. 3 illustrates an exemplary system for providing an extended vision within an environment based on a determined field of view for a person, according to one embodiment. The system 300 includes a number of components that are disposed within the environment 100. The system may also include components that are outside the environment—for example, a server 365 may be located remotely or proximately disposed to the environment (such as within a back room in the same building that is not accessible by customers).

Components within the environment include one or more sensors 305 of various types, such as visual sensors 310, audio sensors 315, and weight sensors 320. The sensors 305 may also include other sensors 325 (which may also include infrared sensors, ultrasonic sensors, etc.). The sensors 305 generally include any sensors that are capable of providing meaningful information about customer interactions with the environment, e.g., location sensors, weight sensors, eye gaze tracking sensors. The sensors 305 may be discrete sensor devices deployed throughout the environment 100 in fixed and/or movable locations. Sensors 305 may be statically included in walls, floors, ceilings, displays, or other non-sensor devices, or may be included in shopping receptacles capable of being transported through the environment. In one embodiment, sensors 305 may include adjustable-position sensor devices, such as motorized cameras (i.e., an example of visual sensors 310) attached to a rail, wire, or frame. In one embodiment, sensors 305 may be included on one or more unmanned vehicles configured to travel through some or all of the environment 100, such as unmanned ground vehicles (UGVs) or unmanned aerial vehicles (UAVs or "drones"). Sensors 305 may also include sensor devices that are included in computing devices associated with the environment 100, such as personal devices 330, employee devices 335, and terminals 340. In some cases, the computing devices (or the component sensor devices) may be implemented as body-worn or carried devices.

Personal devices 330 and employee devices 335 may each include passive or actively-powered devices capable of communicating with at least one of the networked devices of system 300. One example of a passive device (which may be worn or carried) is a NFC tag. Active devices may include mobile computing devices, such as smartphones or tablets, or wearable devices such as a Google Glass™ interactive eyepiece (Glass is a trademark of Google Inc.). The personal devices 330 generally denotes ownership or possession of the devices by customers within the environment 100, while the employee devices 335 denotes ownership or possession by the retailer or other administrator of the environment 100. In some cases, employee devices 335 may be carried by employees and used in the course of their employment. Personal devices 330 and employee devices 335 may execute applications or other program code that generally enables various functions and features accessible using server 365 and/or other networked computing devices. In some embodiments, sensor devices that are included with the personal devices 330 or employee devices 335 may be included in the sensors 305.

System 300 includes a plurality of terminals 340 within the environment 100. Terminals 340 generally include any structure that is capable of receiving input from and/or producing output to people (e.g., customers, employees) within the environment 100. The terminals 340 may include computing systems, portions of computing systems, or devices controllable by computing systems. In one example, a terminal 340 may include a computing device that is communicatively coupled with a visual display and audio speaker(s), as well as being communicatively coupled with one or more input devices. In another example, a terminal 340 may include a visual display and associated driver hardware, but a computing device coupled to the terminal and providing data for display is disposed separately from the terminal. In some embodiments, terminals 340 may be implemented as standalone devices, such as a kiosk disposed on the store floor or monolithic device disposed on a shelf or platform. In some embodiments, terminals 340 may be integrated partially or wholly with other components of the environment 100, such as input or output devices included with shelving or other structural components in the environment (e.g., components used for product display or storage). In some embodiments, terminals 340 may be modular and may be easily attachable and detachable to elements of the environment 100, such as the structural components.

Generally, terminals 340 may be distributed throughout the environment 100 and may enhance various phases of the person's transactions within the environment. For example, terminals 340 may include digital signage (i.e., included as an example of other terminals 355) disposed throughout the environment, such as included in or near aisles, endcaps, displays, and/or shelving in the environment. A person during a transaction may view and/or interact with the digital signage as he or she moves throughout the environment. The digital signage may be included in a static display or may be movable, such as including digital signage within a shopping receptacle. Terminals 340 may also include one or more types of terminals usable for completing checkout transactions, such as employee-manned POS terminals 345 and self-checkout terminals 350. In some cases, the terminals 340 that provide checkout functionality may be disposed within a designated checkout area within the environment 100.

In some embodiments, terminals 340 may provide an integrated functionality. For example, terminals 340 may function in a first mode as digital signage, and when engaged by a person (i.e., receiving input from the person), the terminals function in a second mode as a self-checkout terminal or other type of terminal.

Server 365 generally includes processor(s), memory, and communications capabilities and may perform various computing tasks to support the operation of the environment 100. Server 365 may communicate using various wired and/or wireless communications methods with terminals 340, sensors 305, and with other networked devices such as personal devices 330 and employee devices 335. Server 365 generally executes computer program code in which input data is received from networked devices, the input data is processed and/or stored by the servers, and output data is provided to networked devices for operation of the environment 100.

Network 360 may include one or more networks of various types, including a local area or local access network (LAN), a general wide area network (WAN), and/or a public network (e.g., the Internet). In one embodiment, various networked computing devices of the system 300 are interconnected using a LAN, and one or more computing devices (e.g., server 365, personal devices 330) include connections to the Internet.

Figure 4:
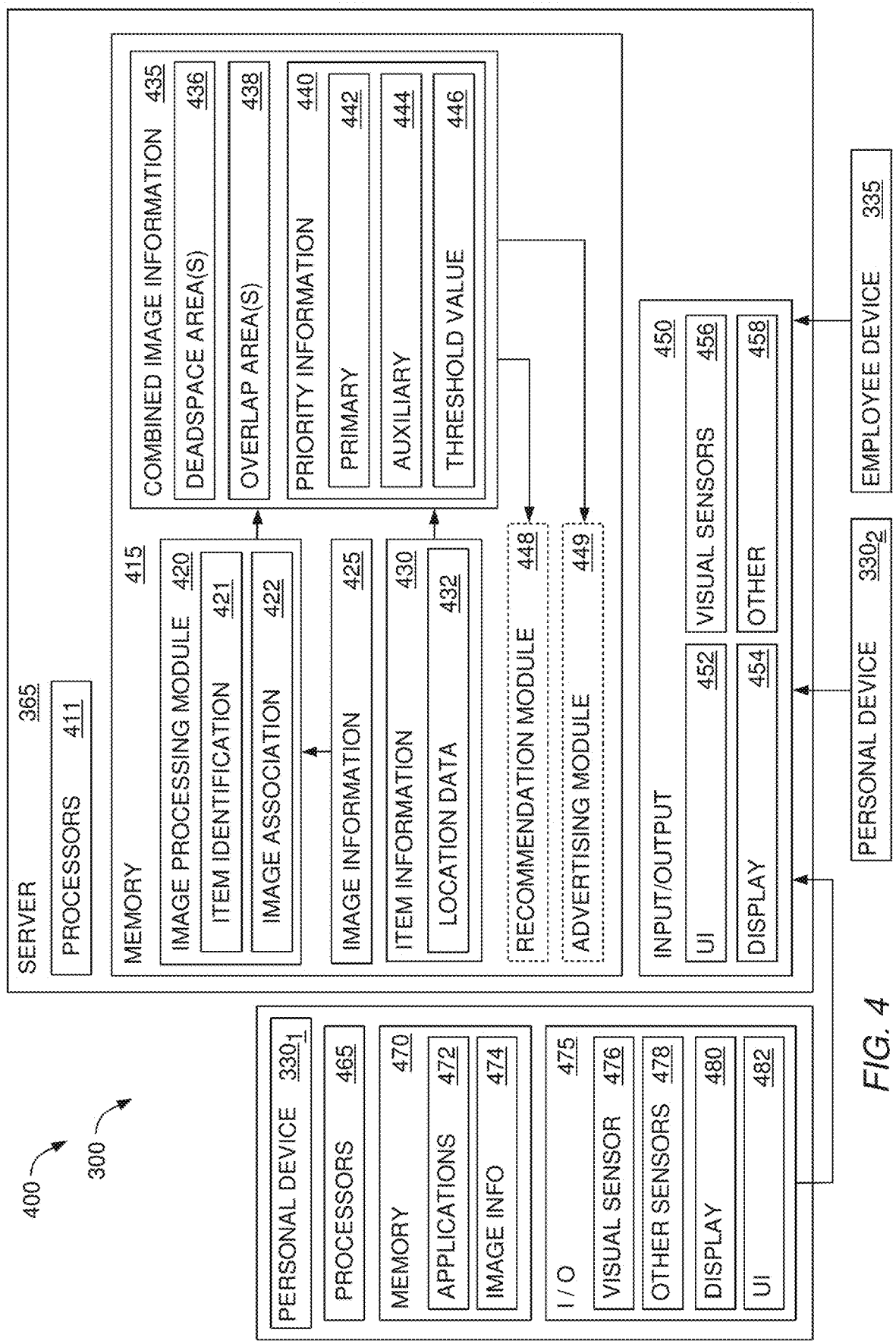
FIG. 4 illustrates the operation of an exemplary system for providing an extended vision within an environment based on a field of view for a person, according to one embodiment.

FIG. 4 is a block diagram illustrating operation of a system for providing an extended vision within an environment based on a determined field of view for a person, according to one embodiment. Generally, the arrangement 400 represents one possible implementation of the system 300 that is suitable for use within the environment 100.

Arrangement 400 includes the server 365, as well as one or more personal devices $330_{1,2}$ associated with customers and one or more employee devices 335. Alternatively, the arrangement 400 may include a different computing device that is generally associated with the environment, such as a terminal or kiosk. In some embodiments, the personal devices 330 and employee devices 335 are mobile computing devices, such as smartphones, tablets, or other worn or carried computing devices. Collectively, the personal devices 330 and employee devices 335 may be referred to as "mobile devices." Each of the computing devices of arrangement 400 (i.e., server 365, personal devices 330, employee devices 335) includes respective processors 410, 465, as well as memory 415, 470 and input/output (I/O) 450, 475.

Through I/O 450, the server 365 is coupled with a user interface (UI) 452, a display 454, one or more visual sensors 456, and optionally other input or output devices 458. Examples of other input devices include other types of sensors, as well as standard computer input devices such as a keyboard, trackpad, touchscreen, etc. Examples of other output devices include other sensory output devices (e.g., audio, haptic, etc.). Although not shown, I/O 450 includes networking connections to enable communication with the mobile devices and/or with other networks, such as the Internet. Similarly, the mobile devices may include a visual sensor 476, other sensors 478, a display 480, and a UI 482.

Memory 415 may store various image information 425 that is acquired using the visual sensors 456. The image information 425 may be in any suitable form, such as image files, frames of video files, etc. Like the server 365, the visual sensors 456 may also be associated with the environment. In some embodiments, the visual sensors 456 may be deployed in a relatively static arrangement throughout the environment (e.g., installed overhead cameras). In some embodiments, some or all of the visual sensors 456 may be movable, such as in reconfigurable product displays. In some embodiments, the visual sensors 456 are actuable, and may be steered or displaced (e.g., such as aerial drones).

In some embodiments, the image information 425 in memory 415 also includes image information 474 that is acquired using other visual sensors, such as visual sensors 476 included with mobile devices. The image information 474 may be acquired during use of the mobile devices in the environment. In other embodiments, the image information 425 and 474 are stored in separate memories (memory 415, 470). To generate the combined image information 435 using both image information 425 and image information 474, the server 365 must first be associated with the mobile devices. In one embodiment, associating the computing devices may be performed wirelessly, and the process may be initiated by executing an application 472 on the personal device $330_1$.

The memory 415 may also store other data related to the environment and associated persons, such as item information 430. Item information 430 may relate to various aspects of the items, such as physical characteristics, reference images, pricing, current inventory levels, and so forth. The item information 430 may also include location data 432 that indicates relative placement of the items within the environment. In one embodiment, the location data 432 may be associated with one or more planograms that generally show a planned arrangement for item placement.

The memory 415 includes one or more functional modules that may be executed using the processors 410, such as an image processing module 420. Image processing module 420 generally operates on image information 425 and/or image information 474 to produce the combined image information 435. The image processing module 420 may include sub-modules for performing item identification 421 and image association 422. Item identification 421 may be performed according to any suitable algorithms, as would be known to the person of ordinary skill in the art. Likewise, image association 422 may be performed according to any suitable algorithms. In one embodiment, image association 422 performs image stitching with image information 425, 474. In some cases, image association 422 may beneficially use item identification 421 to match identified items across image information provided by different ones of the visual sensors 456, 476. Image processing module 420 may also include any other desired image processing functions, such as performing spatial transformations for different image information, sharpening or smoothing the image information, etc.

The combined image information 435 includes image information from various visual sensors that is associated to form a more or less continuous image of portions of the environment. The continuous image may be traversed or navigated, and portions displayed to a person using server 365 or associated computing devices (personal devices 330, employee devices 335). In some embodiments, the combined image information 435 represents image information 425 that is acquired by environment visual sensors (i.e., visual sensors 456) and visual sensors 474 for individual persons, customers, etc. The combined image information 435 may be represented as a 2D or 3D representation of the entire environment, or of selected portions thereof. In one example, the entire environment may be modeled in 3D. In another example, the generated combined image information 435 may correspond to 2D front views of shelving units within the environment. In one embodiment, the combined image information 435 may spatially correspond to planograms for the environment.

The combined image information 435 may be presented to a viewer using a display device, such as a display 454 coupled with the server 365, or the display 480 of one of the mobile devices. In some embodiments, the combined image information 435 is able to be navigated or traversed via a user interface (UI) for the corresponding computing device. As will be further discussed, the display of combined image information 435 provides an extended vision for the viewer that may be useful for overcoming limitations of natural vision (e.g., out-of-sight areas) or gaps in imagery provided by an arrangement of visual sensors.

Determining the combined image information 435 may reveal one or more deadspace areas 436—that is, areas of the environment that the image information acquired from the visual sensors 456, 476 does not include. Generally, deadspace areas are typically dictated by the arrangement of the visual sensors in the environment (e.g., disposition and orientation). In the case of visual sensors having a fixed arrangement, the deadspace areas are not easily overcome, often requiring an employee or technician to physically rearrange the visual sensors. In some cases, the visual sensors 456 may be controlled by the server 365, such as by steering or displacing the visual sensors, which may reduce the sizing and/or number of deadspace areas. In some embodiments, the visual sensors 476 of the mobile computing devices may be advantageously employed to improve the overall coverage of the combined image information 435 and to overcome limitations of the arrangement of visual sensors 456.

In some embodiments, the server 365 may transmit a prompt to a person (e.g., a customer or employee) associated with a particular mobile device in order to acquire image information corresponding to the deadspace areas 436. In some cases, the server 365 may use recommendation module 448 and/or advertising module 449 to encourage the person's cooperation. For example, the server 365 may determine one or more items that are located within or adjacent to a particular deadspace area 436, e.g., referencing location data 432 and/or nearby image information, and suggest the one or more items to the mobile device using recommendation module 448. In another example, the server 365 could overtly request the person's assistance, e.g., requesting that the person go to the area to acquire image information via their mobile device. In some embodiments, the person's assistance may be incentivized using advertising or offering customized discounts, rewards points, etc.

The combined image information 435 in many cases will also include overlap areas 438, which represent areas of the environment included in image information that is acquired by two or more visual sensors 456. For various reasons, it may be beneficial to assess the duplicative image information and to determine a relative priority of the image information for use in the combined image information 435. Using prioritized image information may result in the construction of a better combined image. For example, image information provided by one visual sensor may have a higher resolution (i.e., generally higher priority), or image information from one visual sensor may be relatively distorted due to the overlap area 438 occurring near the periphery of the visual sensor (i.e., generally lower priority), etc. Of course, any number of other factors may be considered when prioritizing image information. For example, even though a visual sensor provides lower resolution imagery, the sensor could receive a higher priority where a small size of the image information is desirable.

Priority information 440 may be used to designate the relative priority of image information corresponding to overlap areas 438. In some cases, the priority may serve as a measure of the relative quality of the image information. As shown, two classes of priority are included—primary 442 and auxiliary 444—although in other embodiments different numbers of levels may be used. In one embodiment, one image information (i.e., corresponding to a particular visual sensor) for an overlap area 438 is classified as primary, and all other image information (i.e., from other visual sensors) is classified as auxiliary. In some cases, the primary image information is used to construct the combined image information, instead of using the auxiliary image information. In some cases, auxiliary image information may be used in the absence of primary image information (e.g., the corresponding visual sensor malfunctions). For example, the server 365 may select auxiliary image information corresponding to the next-largest number of identified items.

In some embodiments, the relative priority of image information may be determined based on numbers of identified items. In one embodiment, the image information corresponding to a larger number of identified items is designated as primary image information for the overlap area, while image information having lesser numbers of items is designated as auxiliary. In one example, comparing numbers of identified items is based on the number of identified items corresponding specifically to the overlap area. In another example, the comparison is based on the number of items identified within the entire image information. In some embodiments, the number of identified items may be compared with a threshold value 446. If none of the numbers of identified items for the different image information meets the threshold value, the server 365 may determine that the image information is inadequate for the overlap area 438. Accordingly, the server 365 may prompt a person in order to obtain new image information for the overlap area, such as by providing a recommendation or request to a person.

Figure 5:
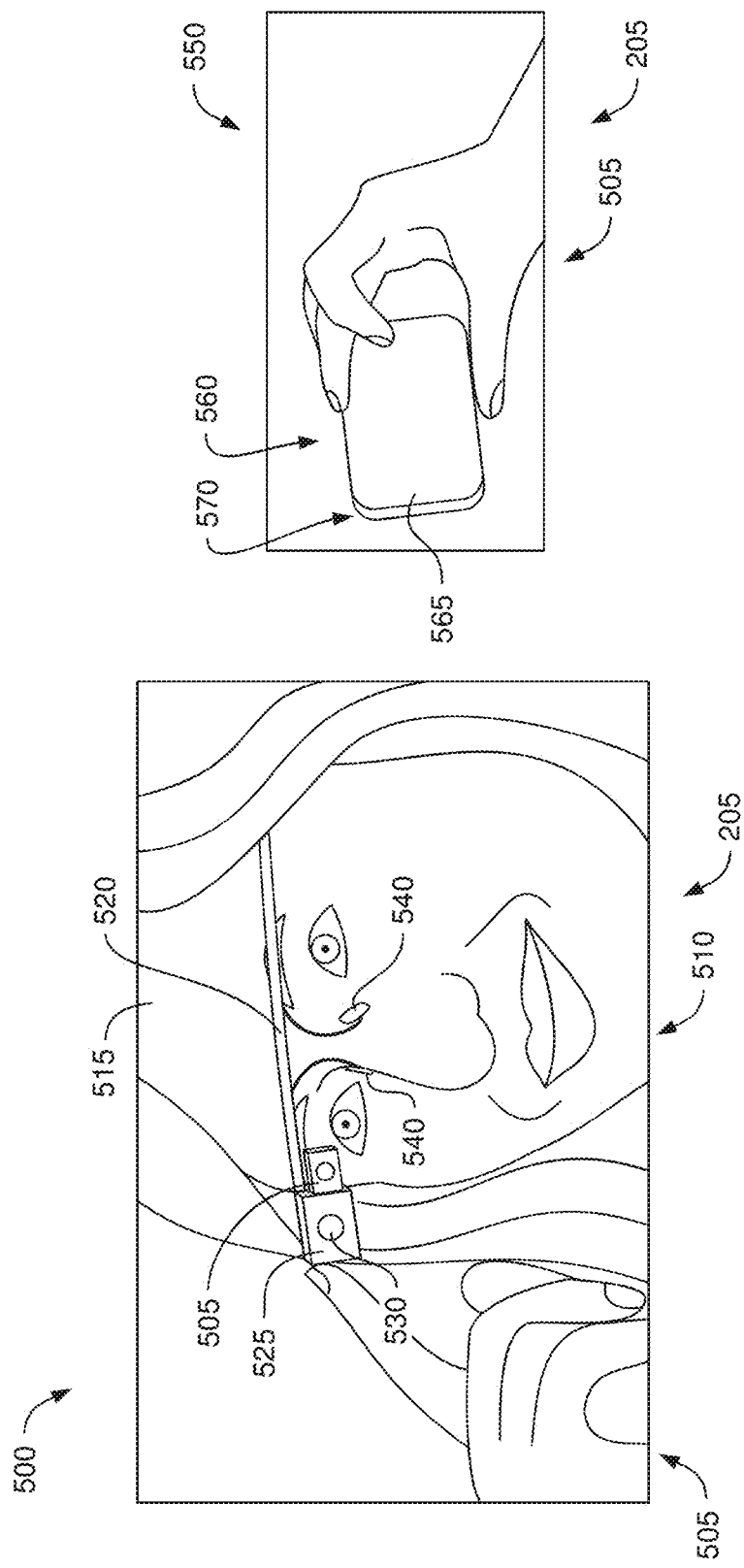
FIG. 5 illustrates example devices for determining a field of view of a person, according to one embodiment.

FIG. 5 illustrates example devices for determining a field of view of a person, according to one embodiment. By using the visual sensors to make a computer-based determination of the person's field of view, combined image information may be seamlessly presented to the person through an associated display device. The combined image information, when displayed to the person, may be navigated or traversed to overcome the person's natural visual limitations. Additionally, the image information acquired from the visual sensors may be used to improve the coverage and/or quality of the combined image information when displayed for other persons.

Scene 560 depicts a person 502 wearing a wearable computing device 565 on her head 504. The wearable computing device 565 includes support members such as a band 566 coupled with nosepieces 568. Although not shown, band 566 may be coupled with the person's head at additional locations, e.g., using compression properties of the band, earpieces, etc. The band 566 supports other structural components, such as a housing 570 that may include the computing device and associated hardware and connections. The housing 570 includes a forward-looking visual sensor 571 oriented through an opening formed in the housing. During operation, the forward-looking visual sensor 571 generally represents the person's field of view. The housing 570 is also coupled with a display 572. In some cases, the display 572 may be transparent and provide information as a visual overlay meant to complement the person's natural field of view.

Scene 580 depicts a person 502 holding a mobile computing device 585 in her hand 503. The mobile computing device 585 includes a display 586 on a first surface and a visual sensor 587 on a second surface (not shown; opposite the first surface). The person 502 adjusts the orientation of the mobile computing device to reorient the visual sensor 587, which may be provided as immediate feedback using the display 586. To acquire field of view information for the person, the person 502 may "aim" the visual sensor 587 at a desired portion of the environment by raising, lowering, or otherwise manipulating the mobile computing device 585.

Figure 6A:
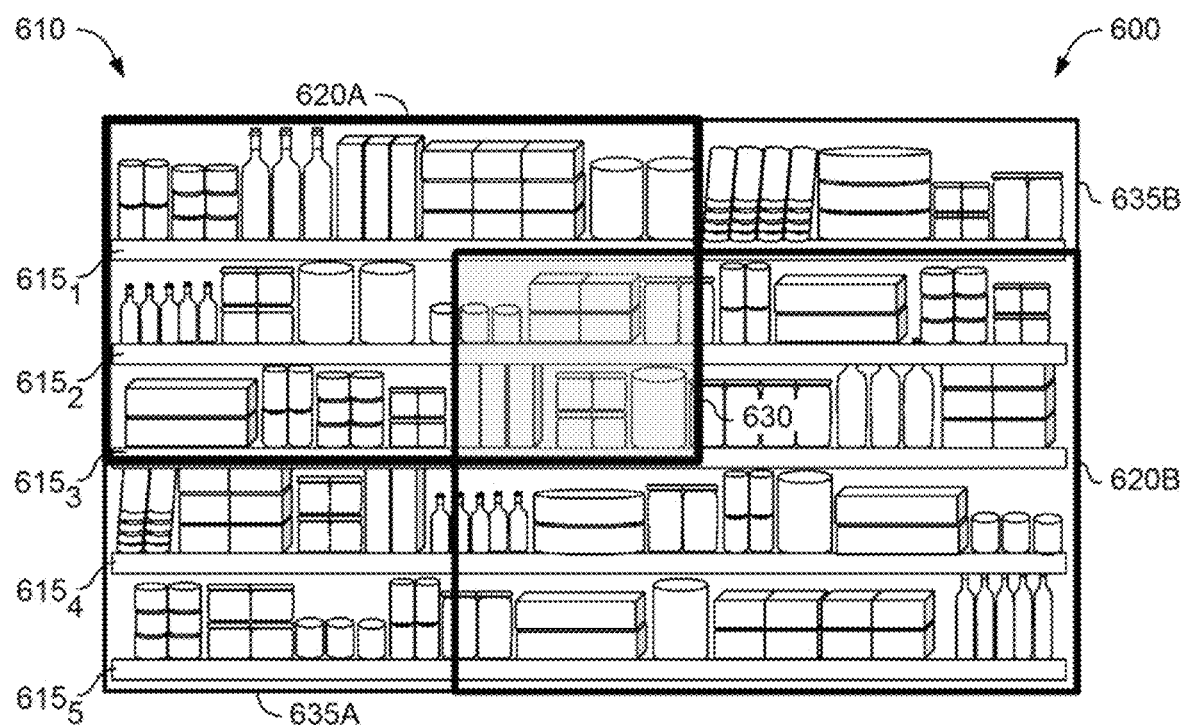
FIGS. 6A and 6B illustrate image information acquired by a plurality of visual sensors, according to one embodiment.
Figure 6B:
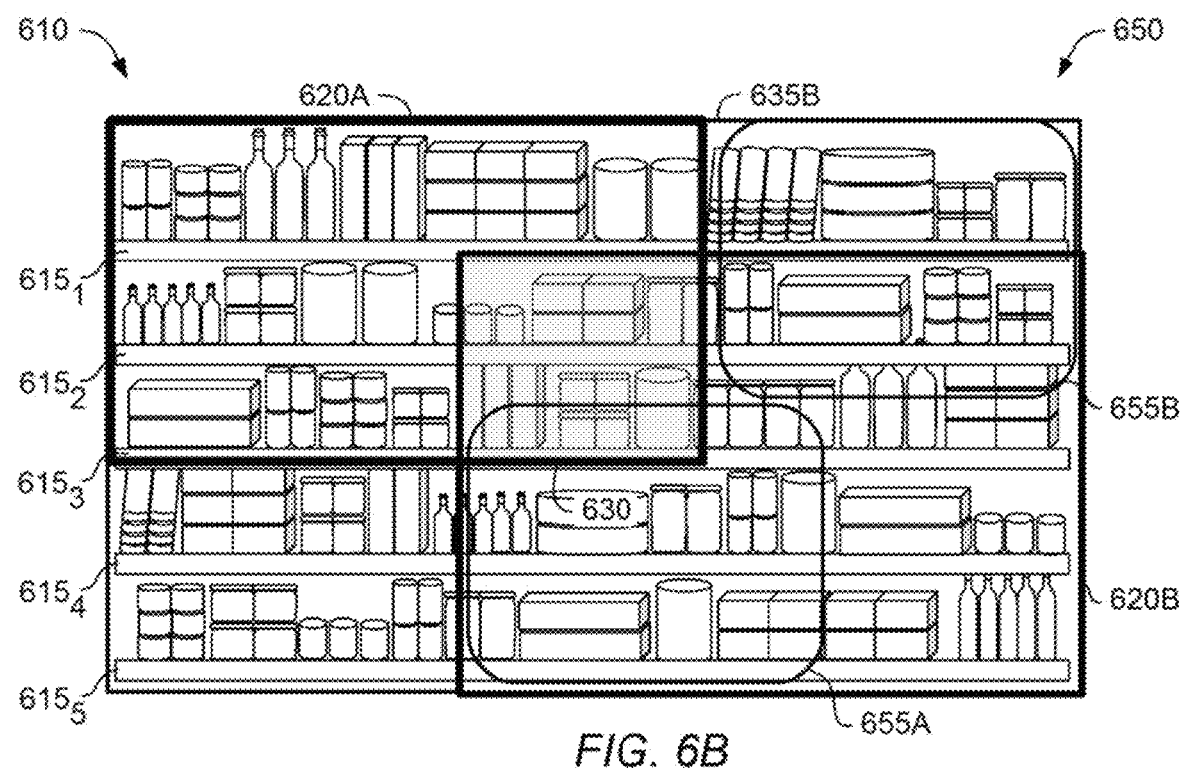

FIGS. 6A and 6B illustrate image information acquired by a plurality of visual sensors, according to one embodiment. Scene 600 depicts a front view of a shelving unit 610 having a number of shelves $615_{1-5}$. In one embodiment, the scene may correspond to a planogram graphic for the shelving unit. Each shelf 615 supports and displays a number of different items (no reference numbers provided). Visual sensors disposed within the environment acquire image information corresponding to portions of the scene 600. For example, a first visual sensor acquires image information 620A while a second visual sensor acquires image information 620B. For simplicity, the image information is shown as rectangular; however, persons of ordinary skill will recognize that the visual sensors may acquire varying shapes and sizes of image information. Further, the image information may be spatially transformed to produce the front view depicted in scene 600. When processed to generate the combined image information, the areas of image information 620A, 620B define an overlap area 630. The areas of image information 620A, 620B also define deadspace areas 635A, 635B having no visual sensor coverage.

Scene 650 depicts a similar view as scene 600 and includes overlaid field of view information for a person. For example, the field of view information may be based on image information acquired from a forward-looking visual sensor of a worn computing device, or a visual sensor included in a carried computing device.

Field of view information 655A corresponds to image information acquired at a first time and may represent the person viewing items on shelves $615_4$ and/or $615_5$. As shown, the field of view area 655A completely overlaps the image information 620B and partly overlaps with image information 620A. In one embodiment, the image information corresponding to field of view area 655A is not stored for use with the combined image information, as the field of view area is already adequately represented by image information 620A, 620B. In another embodiment, the image information is stored consistent with priority criteria. For example, if the image information for field of view area 655A is of higher quality than the image information 620A, 620B, the field of view information may be stored.

At a second time, the person may have field of view area 655B when viewing items on top shelf $615_1$. In one embodiment, the image information corresponding to field of view area 655B will be stored for use with the combined image information, as the field of view area at least partly overlaps with one or more deadspace areas 635B.

In one embodiment, the combined image information is updated periodically by resampling the image information from the visual sensors. In some cases, the updating may be performed substantially continuously (e.g., a video feed). However, the image information corresponding to a person's field of view may be transitory, as the person will likely leave the area or at least look elsewhere. Thus, in some embodiments, the image information corresponding to the person's field of view may be acquired and stored as a still image and, as appropriate, included in the updated combined image information. In one embodiment, the image information corresponding to the person's field of view is updated when a person next acquires image information corresponding to the same deadspace area.

Figure 7:
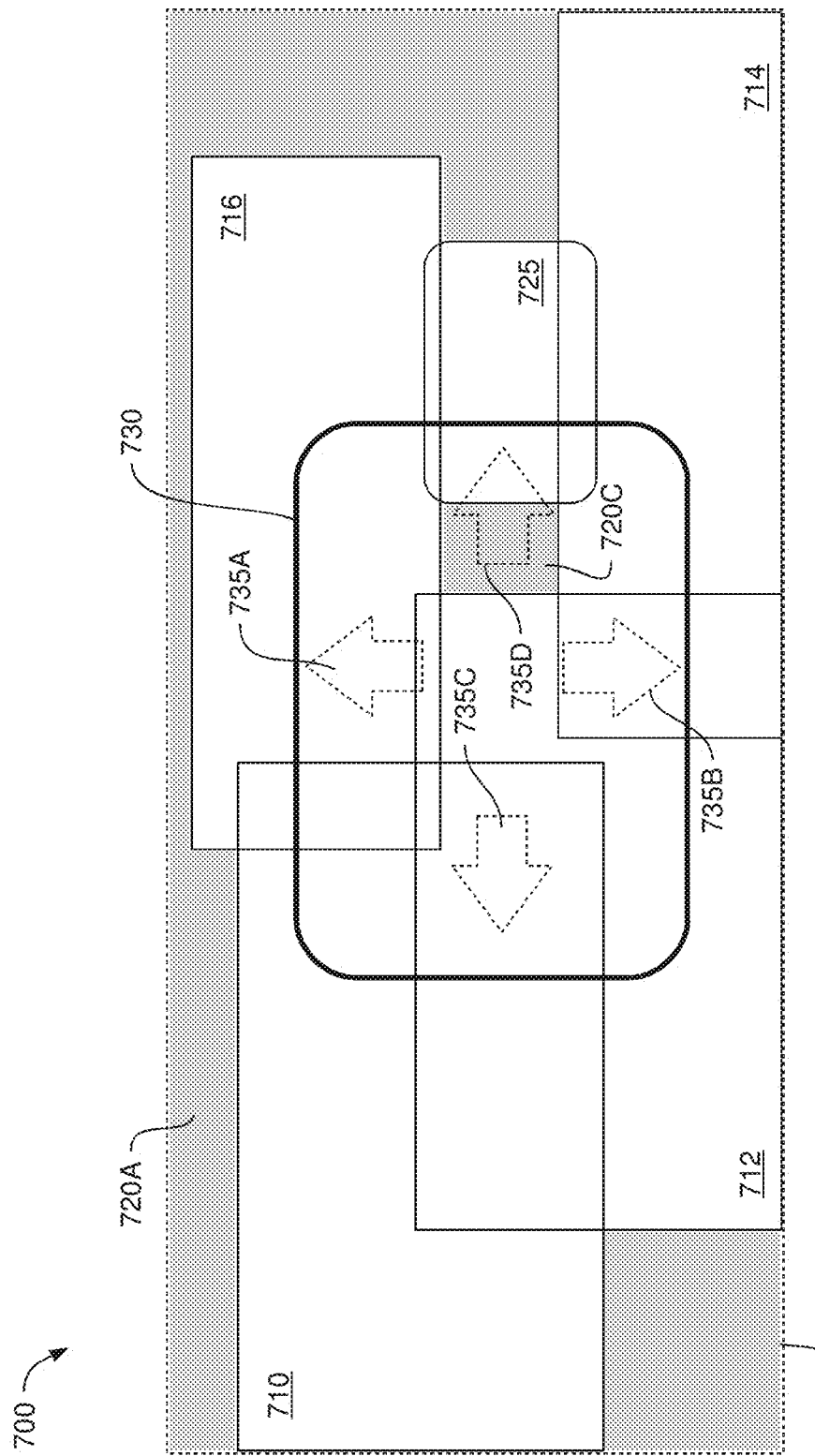
FIG. 7 illustrates an example display of combined image information, according to one embodiment.

FIG. 7 illustrates an example display of combined image information, according to one embodiment. Scene 700 depicts combined image information 705. The combined image information 705 may have any suitable format, such as video, image, or graphics files. In one embodiment, the combined image information 705 may correspond to a planogram of a shelving unit in the environment. The combined image information 705 includes regions of image information acquired by various visual sensors, such as image information 710, 712, 714, 716, and 725. Of course, while displayed as rectangles for simplicity, the image information may have any shape. The combined image information 705 may contain overlap areas, as well as one or more deadspace areas 720A, 720B, 720C.

Selected portions of the combined image information 705 may be displayed, for example, using a display for a mobile computing device or other computing device. Generally, movement of the display area 730 may be used to provide an extended vision for the person using the computing device. In one example, the person (e.g., a customer or employee) may have a current field of view corresponding to the image information 725, but may wish to view items on a top shelf, to browse items the same shelving unit further down the aisle, to view items on another aisle, etc. In another example, the person (e.g., an employee) may wish to navigate the combined image information to check inventory levels, provide security, and so forth. Based on inputs provided through a UI, the display area 730 may be moved relative to the combined image information 705 (i.e., navigating) to display desired portions of the combined image information.

In some embodiments, the display may present visual UI elements, such as arrows 735A-D, in addition to the portion of the combined image information 705 included in the display area 730. When pressed or otherwise selected, the arrows 735 cause the display area to be adjusted in the corresponding direction. In other embodiments, the computing device may include a touchscreen that is able to accept gestures, such as finger swiping, pinching motions, etc. to navigate the combined image information 705.

In some embodiments, the navigation functions provided by the UI may be used to navigate across a substantially continuous combined image information (e.g., a 3D modeling of the environment). For example, the person could navigate along areas that are ordinarily accessible to customers (such as along aisles) as well as areas not normally accessible—the person could navigate between aisles, say, by navigating above the top portions of shelving units. In some embodiments, the navigation functions may be performed across discrete portions of the combined image information. In one example, if combined image information includes discrete 2D representations of each shelving unit, the UI may allow the viewer to select the particular shelving unit (or aisle), and then navigate along the selected shelving unit. In another example, the navigation between discrete portions may be seamless (e.g., navigating past an end of one shelving unit causes a next shelving unit to be displayed).

Deadspace areas 720 may be represented within the combined image information 705 in any suitable manner. For example, deadspace areas may remain blank, may be grayed out, or may use blending from nearby image information. In one example, deadspace area 720C could include a gradient or other transitional graphics from any of image information 710, 712, 714, 716 that define the area. In another example, the image information for deadspace areas may be estimated, such as by copying a portion of adjacent image information. In another example, deadspace areas may include other types of graphical substitution, such as inserting a corresponding portion of planogram graphics. As discussed above, the deadspace areas 720 may be addressed by prompting a person to acquire image information for the area via their (mobile) computing device, and incentivized using advertising or offering customized discounts, rewards points, etc.

Figure 8:
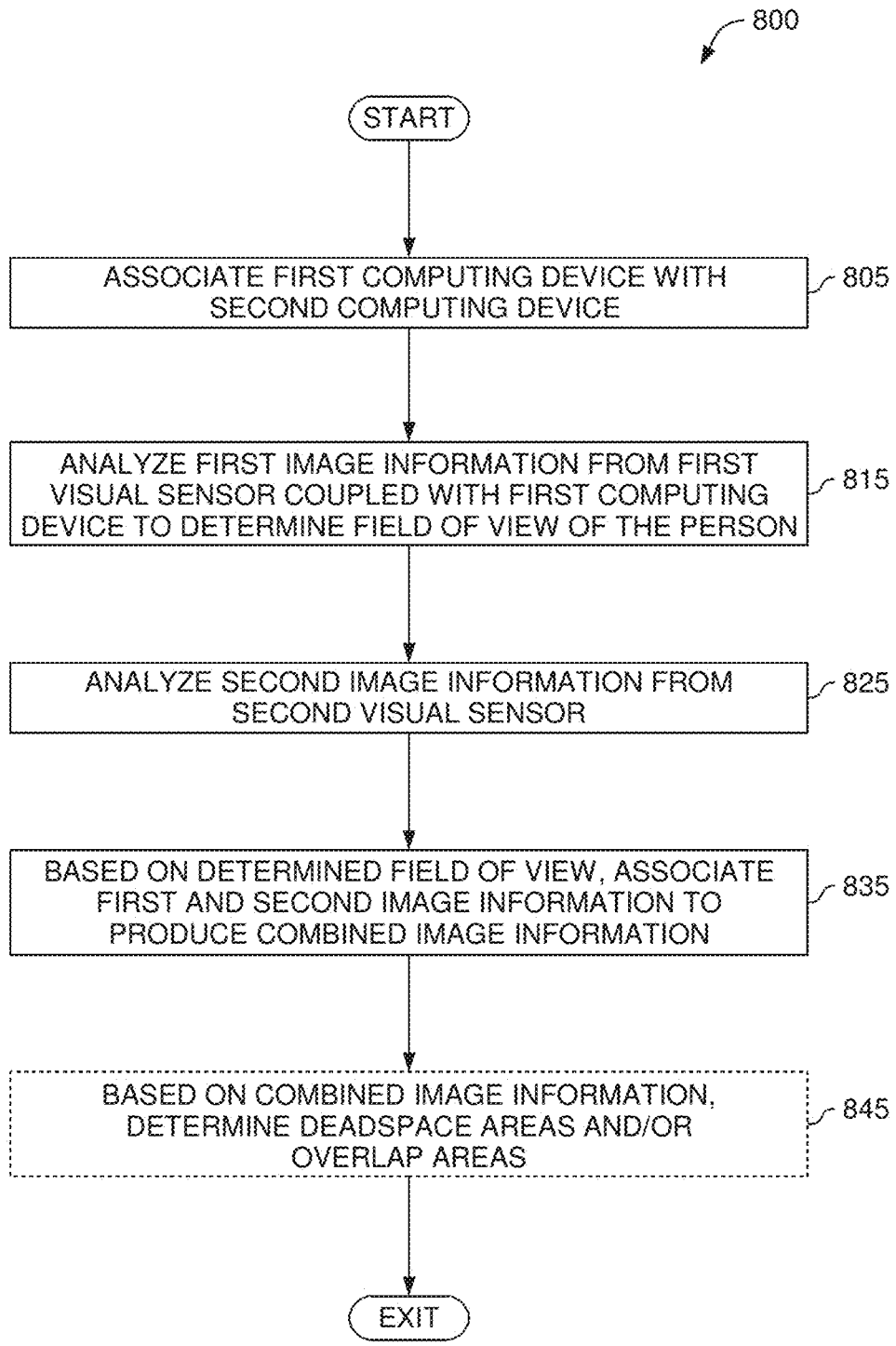
FIG. 8 illustrates a method of providing an extended vision within an environment having a plurality of items for selection, according to one embodiment.

FIG. 8 illustrates a method of providing an extended vision within an environment having a plurality of items available for selection, according to one embodiment. Generally, method 800 may be used consistent with the systems and environments described herein. Method 800 begins at block 805, where a first computing device is associated with a second computing device. In one embodiment, the first computing device is associated with a person, such as a mobile computing device that is worn or carried by the person, and the second computing device is associated with the environment, such as a back-end store server. In one embodiment, associating the first and second computing devices may include opening an application on the first computing device for the environment. In one embodiment, associating the first and second computing devices may be performed upon detecting the presence of the first computing device within the environment.

At block 815, first image information from a first visual sensor is analyzed to determine a field of view of the person. The first visual sensor may be included in the first computing device associated with the person. In some embodiments, the first visual sensor is a forward-looking visual sensor of a body-worn computing device. In other embodiments, the first visual sensor is included in a smartphone or other mobile computing device.

At block 825, second image information from a second visual sensor is analyzed. In one embodiment, the second visual sensor is coupled with the second (environment) computing device, and includes one or more visual sensors that are distinct from the first visual sensor. In one embodiment, the one or more second visual sensors are arranged throughout the environment.

At block 835, and based on the determined field of view, the first and second image information is associated to produce a combined image information. In one embodiment, the combined image information may be generated and stored using the second (environment) computing device. The association of image information may be performed according to any feasible algorithms. In one embodiment, the image information may be stitched to generate the combined image information. In some embodiments, other image processing is performed to the first and/or second image information, such as spatial transformation and/or image enhancement.

At block 845, deadspace and/or overlap areas are optionally determined based on the combined image information. Deadspace areas correspond to portions of the environment not covered by visual sensors, and overlap areas correspond to portions of the environment covered by multiple visual sensors. Method 800 ends following block 835, or optionally block 845.

Figure 9:
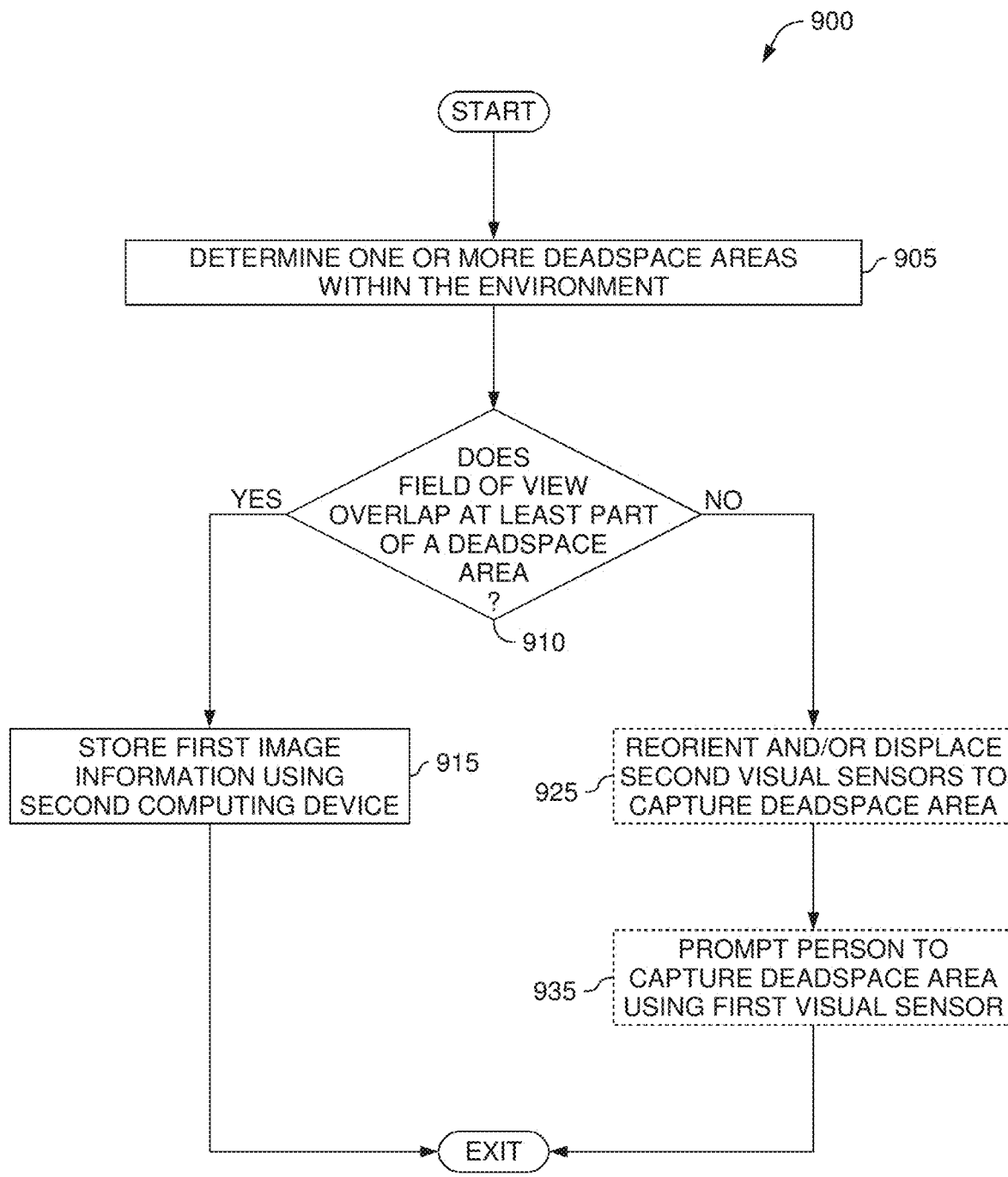
FIG. 9 illustrates a method of producing combined image information to address deadspace areas in the environment, according to one embodiment.

FIG. 9 illustrates a method of producing combined image information to address deadspace areas in the environment, according to one embodiment. In one embodiment, method 900 may be performed following block 845 of method 800.

Method 900 begins at block 905, where one or more deadspace areas are determined within the environment. In one embodiment, deadspace areas are determined based on the image information acquired from the arrangement of visual sensors disposed throughout the environment. At block 910, it is determined whether a field of view of a person overlaps at least part of a deadspace area. The image information used for the field of view determination may be acquired from a visual sensor of a personal computing device.

If the field of view overlaps ("YES"), the method proceeds to block 915, where the image information is stored by the second (environmental) computing device. Thus, the image information acquired using the personal computing device may subsequently be included with the combined image information.

If the field of view does not overlap ("NO"), the method proceeds to block 925 and/or block 935. At block 925, depending on the particular arrangement, the second visual sensors may be reoriented and/or displaced to acquire image information corresponding to the deadspace area. At block 935, the second (environmental) computing device prompts a person to acquire image information for the deadspace areas using a visual sensor included in the associated personal computing device.

Figure 10:
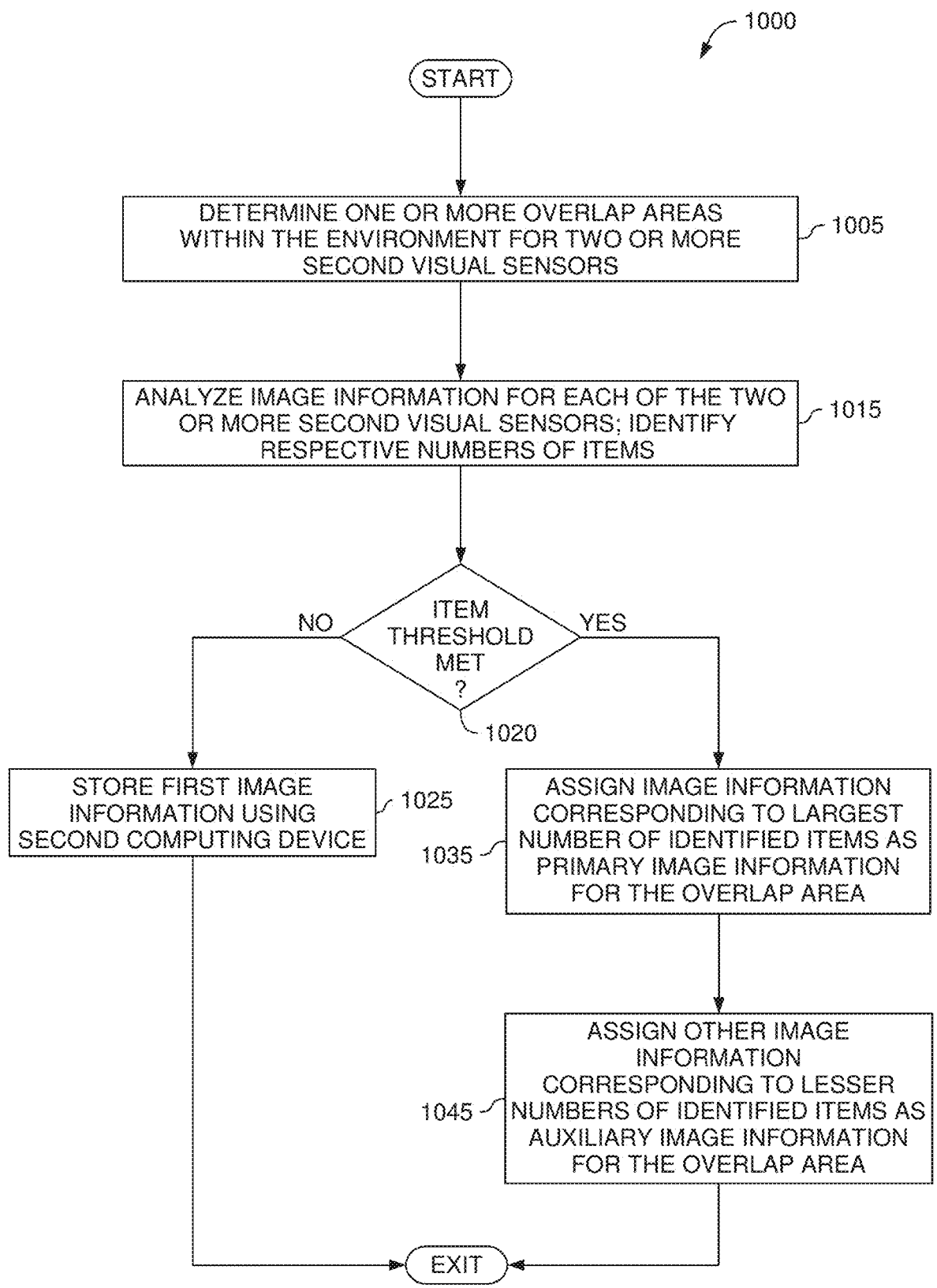
FIG. 10 illustrates a method of producing combined image information based on overlap areas in the environment, according to one embodiment.

FIG. 10 illustrates a method of producing combined image information based on overlap areas in the environment, according to one embodiment. In one embodiment, method 1000 may be performed following block 845 of method 800.

Method 1000 begins at block 1005, where one or more overlap areas are determined corresponding to two or more second visual sensors. In one embodiment, overlap areas are determined based on the image information acquired from the arrangement of visual sensors disposed throughout the environment.

At block 1015, image information for each of the two or more "overlapping" second visual sensors is analyzed to determine respective numbers of identified items included therein. In one embodiment, the numbers of identified items corresponds specifically to the overlap area. In another embodiment, the numbers of identified items includes all of the image information.

At block 1025, the numbers of identified items are compared with an item threshold value. If the threshold is not met ("NO"), the method proceeds to block 1025, where first image information is stored by the second computing device. In some embodiments, block 1025 may include, prior to storing the first image information, prompting a person to acquire the first image information using a visual sensor included in the associated personal computing device.

If the threshold is met ("YES"), the method proceeds to block 1035. Generally, meeting the threshold value may indicate that the image information is of suitable quality for use in the combined image information. At block 1035, the image information corresponding to the largest number of identified items is assigned as the primary image information for the overlap area. At block 1045, the other image information (which have smaller numbers of identified items) is assigned as auxiliary image information for the overlap area.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module," or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a user may access applications (e.g., a retail store app for a mobile computing device) or related data (e.g., compiled shopping data) available in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method to provide an extended vision within an environment having a plurality of items available for selection by a person, the method comprising:
   analyzing first image information acquired using a first visual sensor within the environment to determine a field of view of the person, wherein the first visual sensor is coupled with a first computing device that is body-worn or carried by the person;
   analyzing second image information acquired using a plurality of second visual sensors disposed within the environment, wherein the plurality of second visual sensors are coupled with a second computing device;
   determining that an arrangement of the plurality of second visual sensors results in at least a first deadspace area within the environment, the first deadspace area representing a first portion of the environment that is not represented in the second image information acquired using any of the plurality of second visual sensors;
   determining, using stored location data describing a planned arrangement for placement of the plurality of items within the environment, one or more items of the plurality of items that are within or adjacent to the first deadspace area;
   transmitting, to the first computing device, a prompt suggesting that the person should acquire image information corresponding to the first deadspace area, wherein the prompt comprises a suggestion for the one or more items;
   upon determining that the field of view of the person includes the one or more items, storing at least a portion of the first image information in a memory of the second computing device; and
   generating a combined image information using at least (i) the stored portion of the first image information, and (ii) a portion of the second image information.

2. The method of claim 1, wherein generating the combined image information comprises stitching the first image information and the second image information.

3. The method of claim 1, further comprising:
   displaying, via a display device, at least a portion of the combined image information; and
   displaying, via the display device, a user interface (UI) for traversing the portion of the combined image information.

4. The method of claim 3, further comprising:
   performing, in response to the input provided through the UI, at least one of reorienting and displacing one or more visual sensors of the second visual sensors.

5. The method of claim 1, wherein the first computing device is a body-worn computing device and the first visual sensor is a forward-looking camera integrated with the first computing device.

6. The method of claim 1, wherein the first computing device is a handheld computing device, and
   wherein the person manipulates an orientation of the handheld computing device to acquire the first image information.

7. The method of claim 1, further comprising:
   determining that the arrangement of the plurality of second visual sensors results in at least a first overlap area representing a second portion of the environment acquired in the image information of two or more second visual sensors of the plurality of second visual sensors; and
   analyzing, for each of the two or more second visual sensors, corresponding image information to identify a respective number of the plurality of items included therein;
   assigning, based on a largest number of the identified numbers of the plurality of items, the corresponding visual sensor of the two or more second visual sensors as a primary view for the first overlap area; and
   assigning one other visual sensor of the two or more second visual sensors as an auxiliary view for the first overlap area.

8. The method of claim 7, wherein none of the identified numbers of the plurality of items meet a predetermined threshold value, the method further comprising:
   upon determining that the field of view of the person overlaps at least part of the first overlap area, storing a portion of the first image information corresponding to the overlapping part in the memory of the second computing device.

9. A computer program product to provide an extended vision within an environment having a plurality of items available for selection by a person, the computer program product comprising:
   a computer-readable storage medium having computer-readable program code embodied therewith, the computer-readable program code executable by one or more computer processors to perform an operation that includes:
      analyzing first image information acquired using a first visual sensor within the environment to determine a field of view of the person, wherein the first visual sensor is coupled with a first computing device that is body-worn or carried by the person;
      analyzing second image information acquired using a plurality of second visual sensors disposed within the environment, wherein the plurality of second visual sensors are coupled with a second computing device;

determining that an arrangement of the plurality of second visual sensors results in at least a first deadspace area within the environment, the first deadspace area representing a first portion of the environment that is not represented in the second image information acquired using any of the plurality of second visual sensors;

determining, using stored location data describing a planned arrangement for placement of the plurality of items within the environment, one or more items of the plurality of items that are within or adjacent to the first deadspace area;

transmitting, to the first computing device, a prompt suggesting that the person should acquire image information corresponding to the first deadspace area, wherein the prompt comprises a suggestion for the one or more items;

upon determining that the field of view of the person includes the one or more items, storing at least a portion of the first image information in a memory of the second computing device; and generating a combined image information using at least (i) the stored portion of the first image information, and (ii) a portion of the second image information.

10. The computer program product of claim 9, wherein generating the combined image information comprises stitching the first image information and the second image information.

11. The computer program product of claim 9, wherein the operation further comprises:
displaying, via a display device, at least a portion of the combined image information; and
displaying, via the display device, a user interface (UI) for traversing the portion of the combined image information.

12. The computer program product of claim 9, the operation further comprising:
determining that the arrangement of the plurality of second visual sensors results in at least a first overlap area representing a second portion of the environment acquired in the image information of two or more second visual sensors of the plurality of second visual sensors; and
analyzing, for each of the two or more second visual sensors, corresponding image information to identify a respective number of the plurality of items included therein;
assigning, based on a largest number of the identified numbers of the plurality of items, the corresponding visual sensor of the two or more second visual sensors as a primary view for the first overlap area; and
assigning one other visual sensor of the two or more second visual sensors as an auxiliary view for the first overlap area.

13. The computer program product of claim 12, wherein none of the identified numbers of the plurality of items meet a predetermined threshold value, the operation further comprising:
upon determining that the field of view of the person overlaps at least part of the first overlap area, storing a portion of the first image information corresponding to the overlapping part in the memory of the second computing device.

14. The computer program product of claim 9, the operation further comprising:

performing, in response to the input provided through the UI, at least one of reorienting and displacing one or more visual sensors of the plurality of second visual sensors.

15. A system to provide an extended vision within an environment having a plurality of items available for selection by a person, the system comprising:
a plurality of computer processors, at least one processor included in a first computing device associated with the person, and at least one other processor included in at least one second computing device associated with the environment and communicatively coupled with the first computing device;
a first visual sensor communicatively coupled with the first computing device, the first visual sensor disposed within the environment and configured to acquire first image information; and
a plurality of second visual sensors that are communicatively coupled with the at least one second computing device, the plurality of second visual sensors disposed within the environment and configured to acquire second image information,
wherein the plurality of computer processors are configured to perform an operation that includes:
determining that an arrangement of the plurality of second visual sensors results in at least a first deadspace area within the environment, the first deadspace area representing a first portion of the environment that is not represented in the second image information acquired using any of the plurality of second visual sensors;
determining, using stored location data describing a planned arrangement for placement of the plurality of items within the environment, one or more items of the plurality of items that are within or adjacent to the first deadspace area;
transmitting, to the first computing device, a prompt suggesting that the person should acquire image information corresponding to the first deadspace area, wherein the prompt comprises a suggestion for the one or more items;
upon determining that the field of view of the person includes the one or more items, storing at least a portion of the first image information in a memory of the second computing device; and
generating a combined image information using at least (i) the stored portion of the first image information, and (ii) a portion of the second image information.

16. The system of claim 15, wherein the first computing device is a body-worn computing device and the first visual sensor is a forward-looking camera integrated with the first computing device.

17. The system of claim 15, wherein the first computing device is a handheld computing device, and
wherein the person manipulates an orientation of the handheld computing device to acquire the first image information.

18. The system of claim 15, further comprising:
a display device communicatively coupled with at least one of the first computing device and the second computing device, wherein the operation further includes:
displaying, via the display device, at least a portion of the combined image information; and
displaying, via the display device, a user interface (UI) for traversing the portion of the combined image information.

19. The system of claim 18, wherein the operation further includes:
performing, in response to the input provided through the UI, at least one of reorienting and displacing one or more visual sensors of the plurality of second visual sensors.

20. The system of claim 15, wherein the operation further includes:
determining that the arrangement of the plurality of second visual sensors results in at least a first overlap area representing a second portion of the environment acquired in the image information of two or more second visual sensors of the plurality of second visual sensors; and
analyzing, for each of the two or more second visual sensors, corresponding image information to identify a respective number of the plurality of items included therein;
assigning, based on a largest number of the identified numbers of the plurality of items, the corresponding visual sensor of the two or more second visual sensors as a primary view for the first overlap area; and
assigning one other visual sensor of the two or more second visual sensors as an auxiliary view for the first overlap area.

* * * * *